United States Patent
Song et al.

(10) Patent No.: US 10,727,452 B2
(45) Date of Patent: Jul. 28, 2020

(54) FLEXIBLE SECONDARY BATTERY

(71) Applicant: SAMSUNG SDI CO., LTD., Yongin-si, Gyeonggi-do (KR)

(72) Inventors: Hyunhwa Song, Yongin-si (KR); Junwon Suh, Yongin-si (KR); Jeong-Doo Yi, Yongin-si (KR); Juhee Sohn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 481 days.

(21) Appl. No.: 14/826,177

(22) Filed: Aug. 13, 2015

(65) Prior Publication Data

US 2016/0240824 A1    Aug. 18, 2016

(30) Foreign Application Priority Data

Feb. 13, 2015 (KR) .................. 10-2015-0022716

(51) Int. Cl.
*H01M 6/00* (2006.01)
*H01M 2/02* (2006.01)
*H01M 10/0525* (2010.01)

(52) U.S. Cl.
CPC ..... *H01M 2/0202* (2013.01); *H01M 10/0525* (2013.01); *H01M 2220/30* (2013.01)

(58) Field of Classification Search
CPC .. H01M 2/0202; H01M 2/021; H01M 2/0212; H01M 2/0275; H01M 2/0287; H01M 10/0525; H01M 10/0431; H01M 10/0436; H01M 2002/0297; H01M 2220/30
See application file for complete search history.

(56) References Cited

U.S. PATENT DOCUMENTS

2001/0026886 A1* 10/2001 Inui ............... H01M 2/1061
                                                      429/120
2003/0148177 A1*  8/2003 Wang ............. H01M 2/0212
                                                      429/162
(Continued)

FOREIGN PATENT DOCUMENTS

CN          201196962 Y       2/2009
JP          2000-173559   *   6/2000   .............. H01M 2/02
(Continued)

OTHER PUBLICATIONS

Abstract and Figure of CN 201196962, Feb. 18, 2009, Li et al., Battery Case has multiple concave-convex grooves provided on case wall.*

(Continued)

*Primary Examiner* — Raymond Alejandro
(74) *Attorney, Agent, or Firm* — Lewis Roca Rothgerber Christie LLP (57) ABSTRACT

A flexible secondary battery includes an electrode assembly having a first electrode plate, a second electrode plate, and a separator between the first and second electrode plates; and a pouch comprising a plurality of outwardly extending protrusions, the pouch sealing the electrode assembly and an electrolyte therein, wherein the pouch is configured such that a degree of strain of the electrode assembly resulting from bending of the pouch is lower than a degree of strain on the pouch from formation of the protrusions.

20 Claims, 5 Drawing Sheets

(56) References Cited

U.S. PATENT DOCUMENTS

2013/0084487 A1 4/2013 Kwak et al.
2013/0101884 A1* 4/2013 Ueda .................. H01M 10/052
429/127

FOREIGN PATENT DOCUMENTS

| JP | 2005-108747 A | 4/2005 |
|----|---------------|--------|
| JP | 2006-236938 A | 9/2006 |
| JP | 2009-16275    | 1/2009 |
| JP | 4661124 B2    | 1/2011 |
| JP | 4830289 B2    | 9/2011 |
| KR | 10-1307427 B1 | 9/2013 |

OTHER PUBLICATIONS

English Abstract for JP 4661124 B2, which corresponds to JP Publication No. 2006049054 A, published Feb. 16, 2006, and Full English Translation, 24 pages.

English Abstract for JP 4830289 B2, which corresponds to JP Publication No. 2006156049 A, published Jun. 15, 2006, and Full English Translation, 72 pages.

Full English Translation for JP 2005-108747 A, 36 pages.

Full English Translation for JP 2006-236938 A, 33 pages.

English Abstract for KR 10-1307427 B1, which corresponds to KR Publication No. 10-2013-0084545 A, published Jul. 23, 2013, 1 page.

Extended European Search Report dated Jun. 7, 2016 issued in corresponding EP Application No. 16153353.4-1373, 6 pages.

EPO Office Action dated Apr. 23, 2018, for corresponding European Patent Application No. 16153353.4 (5 pages).

Chinese Patent Office Action with English Translation for corresponding Chinese Patent Application No. 201610064251.5, dated Oct. 9, 2019, 12 pages.

Japanese Office Action for corresponding Japanese Patent Application No. 2016-015022, dated Oct. 1, 2019, 6 pages.

Chinese Office action, with English translation, dated Mar. 16, 2020, for corresponding Chinese Patent Application No. 201610064251.5 (11 pages).

\* cited by examiner

FLEXIBLE SECONDARY BATTERY

CROSS-REFERENCE TO RELATED APPLICATION

This application claims priority to and the benefit of Korean Patent Application No. 10-2015-0022716, filed on Feb. 13, 2015, in the Korean Intellectual Property Office, the entire disclosure of which is incorporated herein by reference.

BACKGROUND

1. Field

One or more exemplary embodiments relate to a flexible secondary battery.

2. Description of the Related Art

Along with the development of electronics, markets for cellular phones, portable multimedia players (PMPs), and mpeg audio layer-3 (MP3) players, as well as markets for other various portable electronic devices such as smartphones, smart pads, electronic book readers, flexible tablet computers, and portable medical devices attachable to the human body have grown markedly.

The growth of markets for such portable electronic devices has increased the demand for batteries suitable for operating such portable electronic devices. In addition, such portable electronic devices are increasingly required to be flexible to endure transportation, storage, and impact, and thus the demand for flexible batteries has also increased.

SUMMARY

One or more exemplary embodiments include a flexible secondary battery which is stable even when repeatedly flexed or bent.

Additional aspects will be set forth in part in the description which follows and, in part, will be apparent from the description, or may be learned by practice of the presented embodiments.

According to one or more exemplary embodiments, a flexible secondary battery includes: an electrode assembly including a first electrode plate, a second electrode plate, and a separator between the first and second electrode plates; and a pouch including a plurality of outwardly extending protrusions and sealing the electrode assembly and an electrolyte therein, wherein a degree of strain of the electrode assembly resulting from bending of the pouch is lower than a degree of strain given to the pouch by formation of the protrusions.

A flat base portion may be formed between the protrusions.

Each of the protrusions may include: a first curved portion protruding outward; and a second curved portion formed along an edge of the first curved portion.

The second curved portion may be separate from a center of the first curved portion by a constant distance and may completely surround the first curved portion.

The first curved portion may be convex, and the second curved portion may be concave.

The first curved portion may have a greater radius of curvature than a radius of curvature of the second curved portion.

The first curved portion and the second curved portion may have radii of curvature satisfying the following formula:

$$(x+t+a)^2 + b^2 = (x+y)^2$$

$$y = t + H + a$$

$$x = \frac{b^2}{2H} - \frac{H}{2} - t - a$$

where t=thickness of the pouch, x=radius of curvature of the second curved portion, y=radius of curvature of the first curved portion, b=radius of each of the protrusions, H=height of each of the protrusions, and a=y−H−t.

The pouch may have a thickness of about 0.05 mm to about 0.1 mm.

The radius of each of the protrusions may range from about 0.05 mm to about 1.8 mm.

The height of each of the protrusions may range from about 0.05 mm to about 1.0 mm.

A ratio of the vertical cross-sectional area to the surface area of each of the protrusions may be greater than about 1:1 but less than about 1:3.

The number of protrusions per unit area (1 cm$^2$) of the pouch may be about 5 to about 125.

The flexible secondary battery may further include: a first electrode tab connected to the first electrode plate; and a second electrode tab connected to the second electrode plate.

According to one or more exemplary embodiments, a flexible secondary battery includes: an electrode assembly including a first electrode plate, a second electrode plate, and a separator between the first and second electrode plates; and a pouch including an outwardly protruding pattern unit and sealing the electrode assembly and an electrolyte therein, wherein the pattern unit includes: a protrusion; a sub-protrusion disposed close to the protrusion; and a base portion disposed between the protrusion and the sub-protrusion.

The protrusion may include: a first curved portion protruding outward; and a second curved portion formed outside the first curved portion and connected to the base portion.

The second curved portion may be separate from a center of the first curved portion by a constant distance and may fully surround the first curved portion.

The first curved portion may be convex, and the second curved portion may be concave.

The first curved portion may have a greater radius of curvature than a radius of curvature of the second curved portion.

The pattern unit may have a first direction, a second direction perpendicular to the first direction, and a third direction perpendicular to the first and second directions, and the protrusion may protrude in the third direction, wherein the pattern unit may have a cross-section perpendicular to the first direction and parallel to the second and third directions, wherein the cross-section may have a second-direction length that is longer than a second-direction unit length of the pattern unit.

The second-direction length of the cross-section of the pattern unit may vary along the first direction.

The first curved portion and the second curved portion may have radii of curvature satisfying the following formula:

$$(x+t+a)^2 + b^2 = (x+y)^2$$

-continued $$y = t + H + a$$

$$x = \frac{b^2}{2H} - \frac{H}{2} - t - a$$

where t=thickness of the pouch, x=radius of curvature of the second curved portion, y=radius of curvature of the first curved portion, b=radius of the protrusion, H=height of the protrusion, and a=y−H−t.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings. Effects and features of the exemplary embodiments, and implementation methods thereof will be clarified through the following descriptions given with reference to the accompanying drawings. In this regard, the exemplary embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the exemplary embodiments will be described in detail with reference to the accompanying drawings. In the drawings, like reference numerals denote like elements, and overlapping descriptions thereof will be omitted.

In the following descriptions of the exemplary embodiments, although the terms "first" and "second" are used to describe various elements, these elements should not be limited by these terms. These terms are only used to distinguish one element from another element.

In the following descriptions of the exemplary embodiments, the terms of a singular form may include plural forms unless referred to the contrary.

In the following descriptions of the exemplary embodiments, the meaning of "include," "comprise," "including," or "comprising" specifies a property, a region, a fixed number, a step, a process, an element, a component, and a combination thereof but does not exclude other properties, regions, fixed numbers, steps, processes, elements, components, and combinations thereof.

It will be understood that when a film, a region, or an element is referred to as being "above" or "on" another film, region, or element, it can be directly above or on the other film, region, or element, or intervening films, regions, or elements may also be present.

Sizes of elements in the drawings may be exaggerated for convenience of explanation. In other words, since sizes and thicknesses of components in the drawings are arbitrarily illustrated for convenience of explanation, the following embodiments are not limited thereto.

In the following description of exemplary embodiments, the directions of a flexible secondary battery 100 are defined for clarity in illustration as follows: the length direction of the flexible secondary battery 100 is defined as an x-axis direction, the width direction of the flexible secondary battery 100 is defined as a y-axis direction, and the thickness direction of the flexible secondary battery 100 is defined as a z-axis direction.

Figure 1:
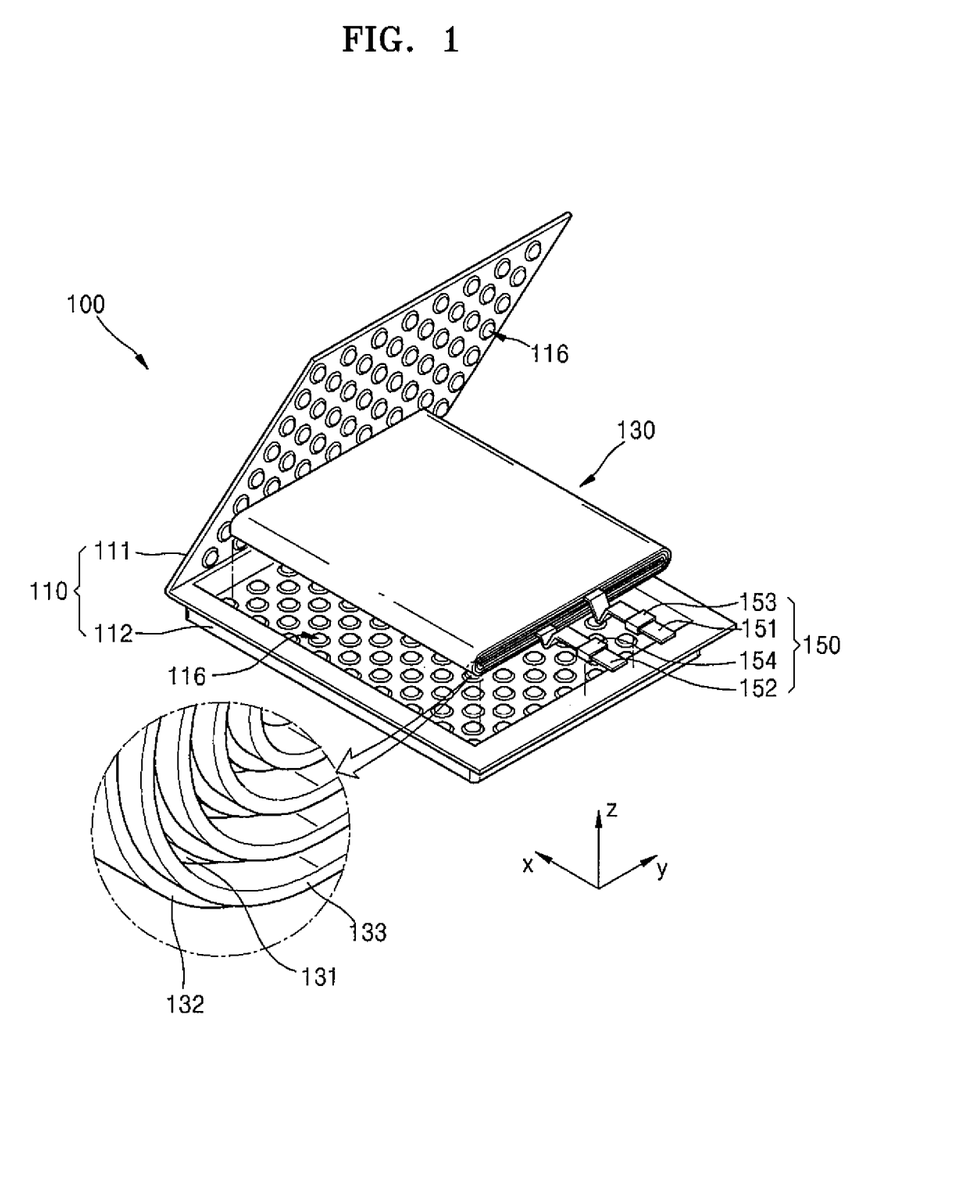
FIG. 1 is an exploded perspective view schematically illustrating a flexible secondary battery according to an exemplary embodiment.
Figure 2:
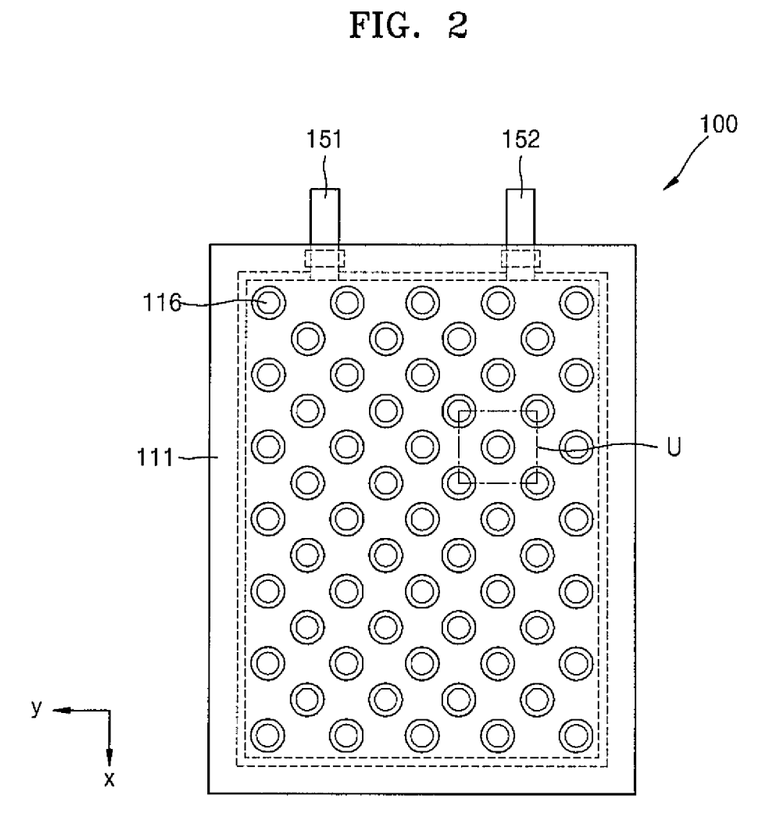
FIG. 2 is a plan view illustrating the flexible secondary battery depicted in FIG. 1.

FIG. 1 is an exploded perspective view schematically illustrating the flexible secondary battery 100 according to an exemplary embodiment, and FIG. 2 is a plan view illustrating the flexible secondary battery 100 depicted in FIG. 1.

Referring to FIGS. 1 and 2, the flexible secondary battery 100 may include a pouch 110, an electrode assembly 130, and electrode tabs 150 such as first and second electrode tabs 151 and 152.

The pouch 110 may accommodate the electrode assembly 130 together with an electrolyte and seal the electrode assembly 130 and the electrolyte. The pouch 110 may be flexible and prevent permeation of moisture or oxygen into the flexible secondary battery 100. The pouch 110 may include: a first sealing material 111 covering a surface of the electrode assembly 130; and a second sealing material 112 covering an opposite surface of the electrode assembly 130 and connected to the first sealing material 111.

The pouch 110 may have a stacked structure formed by an insulation layer, a barrier layer, and an insulation layer. For example, the pouch 110 may be formed by sequentially stacking insulation and barrier layers. The pouch 110 may include a plurality of barrier layers, and the barrier layers may have different thicknesses.

For example, a first barrier layer formed at a side of the pouch 110 may be thinner than a second barrier layer facing the first barrier layer. When the pouch 110 is formed in a curved shape, elongation of the pouch 110 increases in a direction away from the center of curvature of the curved shape. For example, the first barrier layer of the pouch 110, relatively distant from the center of curvature of the curved shape, may be easily elongated, compared to the second barrier layer. Therefore, the breakage or deformation of the pouch 110 may be minimized, and the durability of the pouch 110 may be improved.

In addition, the first barrier layer of the pouch 110 may be formed of a material having a relatively high degree of elongation, and the second barrier layer of the pouch 110 may be formed of a material having a relatively low degree of elongation compared to the first barrier layer. In this case, when the pouch 110 is formed in a curve shape, the first barrier layer of the pouch 110, relatively distant from the center of curvature of the curved shape, may be easily elongated, compared to the second barrier layer. Therefore, the breakage or deformation of the pouch 110 may be minimized, and the durability of the pouch 110 may be improved.

The barrier layers may be formed of a material such as aluminum, steel, stainless steel, or a polymer, and the Insulation layers may be formed of a material such as chlorinated polypropylene (CPP), polyethylene terephthalate (PET), or nylon. However, the barrier layers and the Insulation layers are not limited thereto.

The electrode assembly 130 may include a first electrode layer 131, a second electrode layer 132, and a separator 133 located between the first electrode layer 131 and the second electrode layer 132. The electrode assembly 130 may be formed by repeatedly stacking the first electrode layer 131, the separator 133, and the second electrode layer 132, or rolling the first electrode layer 131, the separator 133, and the second electrode layer 132 in the form of a jelly roll. For ease of description, the case in which the electrode assembly 130 has a stacked structure formed by the first electrode layer 131, the separator 133, and the second electrode layer 132 will be primarily described in detail.

The first electrode layer 131 may be one of a positive electrode film and a negative electrode film. If the first electrode layer 131 is a positive electrode film, the second electrode layer 132 may be a negative electrode film. On the other hand, if the first electrode layer 131 is a negative electrode film, the second electrode layer 132 may be a positive electrode film.

The first electrode layer 131 may include a first metal collector, a first active material-coated portion formed by coating the first metal collector with a first active material, and a first non-coated portion which is a portion of the first metal collector that is not coated with the first active material. Similarly, the second electrode layer 132 may include a second metal collector, a second active material-coated portion formed by coating the second metal collector with a second active material, and a second non-coated portion which is a portion of the second metal collector that is not coated with the second active material.

If the first electrode layer 131 is a positive electrode film, the first metal collector may be a positive electrode collector, and the first active material-coated portion may be a positive electrode active material-coated portion. If the second electrode layer 132 is a negative electrode film, the second metal collector may be a negative electrode collector, and the second active material-coated portion may be a negative electrode active material-coated portion.

The positive electrode collector may be a metal collector formed of aluminum, stainless steel, titanium, copper, silver, or a combination thereof. The positive electrode active material-coated portion may include a positive electrode active material, a binder, and a conducting agent.

The positive electrode active material may be a material capable of reversibly intercalating and deintercalating lithium ions. For example, the positive electrode active material includes at least one material selected from the group consisting of lithium transition metal oxides such as lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate; nickel sulfides; copper sulfides; sulfur; iron oxides; and vanadium oxides.

The binder may include at least one material selected from the group consisting of polyvinylidene fluoride-containing binders such as polyvinylidene fluoride, vinylidene fluoride/hexafluoropropylene copolymer, and vinylidene fluoride/tetrafluroethylene copolymer; carboxymethyl cellulose-containing binders such as sodium-carboxymethyl cellulose and lithium-carboxymethyl cellulose; acrylate-containing binders such as polyacrylic acid, lithium-polyacrylic acid, acrylic, polyacrylonitrile, polymethyl methacrylate, and poly(butyl acrylate); polyamide-imides; polytetrafluoroethylene; polyethylene oxide; polypyrrole; lithium-Nafion; and styrene butadiene rubber-containing polymers.

The conducting agent may include at least one material selected from the group consisting of carbon-containing conducting agents such as carbon black, carbon fiber, and graphite; conductive fiber such as metal fiber; metal powder such as carbon fluoride powder, aluminum powder, and nickel powder; conductive whisker such as zinc oxides and potassium titanate; conductive metal oxides such as titanium oxides; and conductive polymers such as polyphenylene derivatives.

The negative electrode collector may include at least one metal selected from the group consisting of copper, stainless steel, nickel, aluminum, and titanium. The negative electrode active material-coated portion may include a negative electrode active material, a binder, and a conducting agent.

The negative electrode active material may be a material capable of forming an alloy together with lithium or capable of reversibly intercalating and deintercalating lithium. For example, the negative electrode active material may be include at least one material selected from the group consisting of metals, carbon-containing materials, metal oxides, and lithium metal nitrides.

The metals may include at least one selected from the group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

The carbon-containing materials may include at least one material selected from the group consisting of graphite, graphite carbon fiber, coke, mesocarbon microbeads (MCMBs), polyacene, pitch-derived carbon fiber, and hard carbon.

The metal oxides may include at least one selected from the group consisting of lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

The binder and the conducting agent may be the same as the binder and the conducting agent included in the positive electrode active material.

The positive electrode film and the negative electrode film may be formed by applying active materials to metal collectors by various methods. That is, methods of applying electrode active materials are not limited.

The separator 133 may be a porous polymer film such as a polyethylene film or a polyprophylene film. The separator 133 may be woven fabric or non-woven fabric including polymer fabric. The separator 133 may include ceramic particles and may be formed of solid polymer electrolyte. The separator 133 may be an independent film or may be a porous layer formed on the first electrode layer 131 or the second electrode layer 132.

The separator 133 electrically separates the first electrode layer 131 and the second electrode layer 132 from each other, and the separator 133 is not required to have the same shape as the shape of the first electrode layer 131 or the second electrode layer 132.

The electrode tabs 150 may be connected to the electrode assembly 130 for electric connection with an external device. The first electrode layer 131 is electrically connected to the first electrode tab 151, and the second electrode layer 132 is electrically connected to the second electrode tab 152. The first electrode tab 151 may include a first insulator 153, and the second electrode tab 152 may include a second insulator 154, so as to prevent a short circuit between the first and second electrode layers 131 and 132. Materials that may be used to form the first insulator 153 and the second insulator 154 are not limited as long as the materials are insulative.

Figure 3:
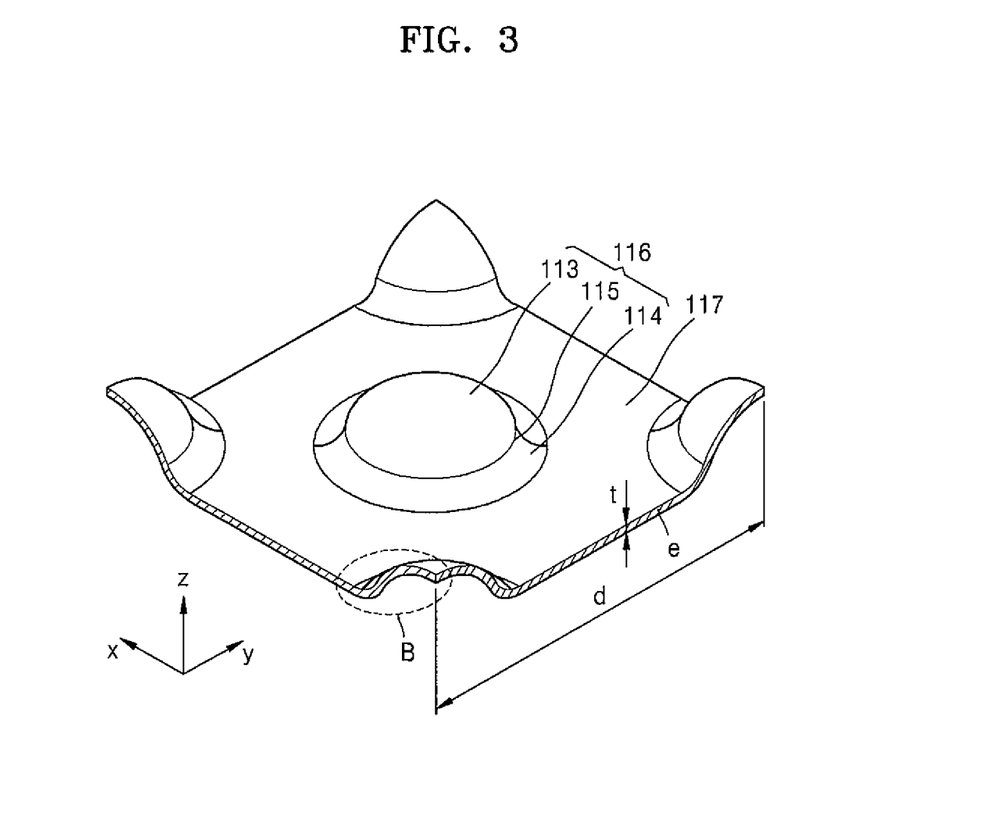
FIG. 3 is a perspective view illustrating a portion of a pouch depicted in FIG. 2.
Figure 4:
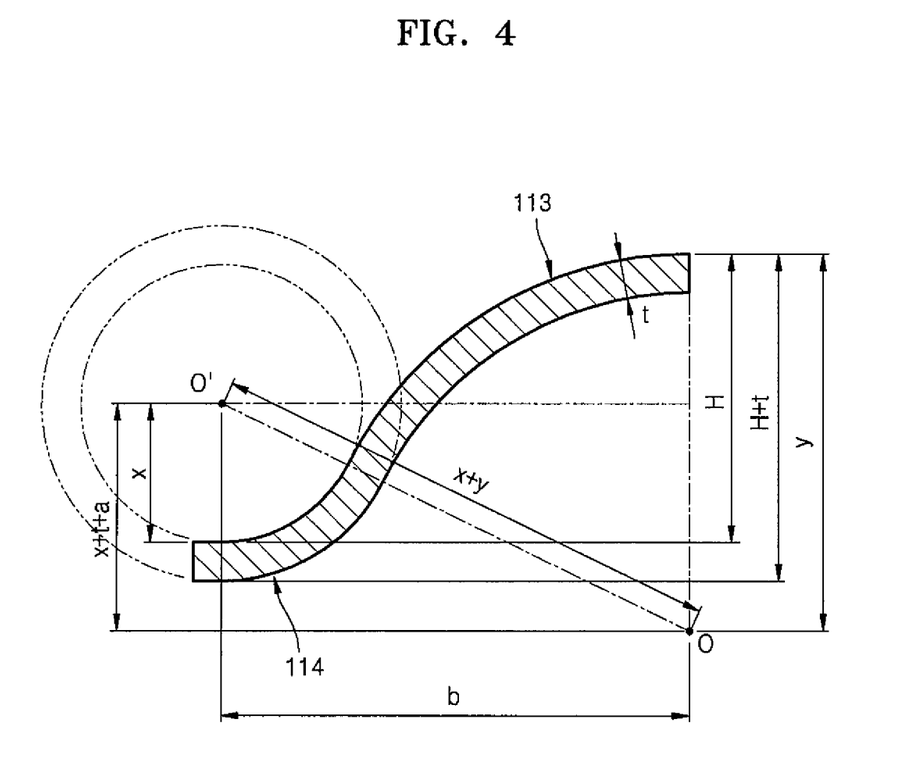
FIG. 4 is a cross-sectional view illustrating a region B in FIG. 3.

FIG. 3 is a perspective view illustrating a portion of the pouch 110 depicted in FIG. 2, and FIG. 4 is a cross-sectional view illustrating a region B in FIG. 3. The size and arrangement of protrusions 116 of the pouch 110 will now be described in detail with reference to FIGS. 3 and 4.

As described above, the pouch 110 may include: the first sealing material 111 covering a surface of the electrode assembly 130; and the second sealing material 112 covering an opposite surface of the electrode assembly 130 and connected to the first sealing material 111. The protrusions 116 may be formed on one or more of the first sealing material 111 and the second sealing material 112. One or more protrusions 116 may be formed. For ease of description, the following description is presented under the assumption that each of the first and second sealing materials 111 and 112 includes a plurality of protrusions 116.

Each of the protrusions 116 may include a first curved portion 113 protruding outward from the pouch 110 and a second curved portion 114 formed along the edge of the first curved portion 113. A curvature change portion 115 may be formed between the first curved portion 113 and the second curved portion 114. The pouch 110 may include a base portion 117 among the protrusions 116.

The pouch 110 may include pattern units U as shown in FIG. 2. Each of the pattern units U may include a protrusion 116, sub-protrusions formed close to the protrusion 116, and the base portion 117 formed among the sub-protrusions. The sub-protrusions are portions of protrusions 116. In other words, in combinations of the pattern units U, sub-protrusions combining with other sub-protrusions may form protrusions 116.

Each of the pattern units U may include four sub-protrusions located close to a central one of the protrusions 116. In one embodiment, the sub-protrusions are substantially equal to the quadrisections of one protrusion 116. Therefore, if four pattern units U are combined, a protrusion 116 may be formed by a combination of sub-protrusions. Thus, the following description will be primarily directed to the protrusions 116.

In each of the protrusions 116, the first curved portion 113 may have a convex shape, and the second curved portion 114 may have a concave shape. The second curved portion 114 may be separate from the center (O) of the first curved portion 113 by a constant distance and may fully surround the first curved portion 113. The radius of curvature (y) of the first curved portion 113 may be greater than the radius of curvature (x) of the second curved portion 114.

Referring to FIG. 4, Formula 1 for calculating the radius of curvature (y) of the first curved portion 113 and the radius of curvature (x) of the second curved portion 114 may be derived as follows.

$$(x+t+a)^2 + b^2 = (x+y)^2 \quad \text{Formula 1}$$
$$y = t + H + a$$
$$x = \frac{b^2}{2H} - \frac{H}{2} - t - a$$

In FIG. 4, O denotes the center of curvature of the first curved portion 113, O' denotes the center of curvature of the second curved portion 114, t denotes the thickness of the pouch 110, x denotes the radius of curvature of the second curved portion 114, and y denotes the radius of curvature of the first curved portion 113. Further, b refers to the radius of the protrusion 116, which is a distance from the center of the first curved portion 113 to an edge of the second curved portion 114. H refers to the height of the protrusion 116, which is a distance from a surface of the base portion 117 to the apex of the first curved portion 113 while a refers to a value calculated by subtracting the height (H) of the protrusion 116 and the thickness (t) of the pouch 110 from the radius of curvature (y) of the first curved portion 113 (a=y−H−t).

Referring to FIG. 4, the first equation of Formula 1 may be derived using the Pythagorean theorem. In addition, the second equation of Formula 1 may be derived from a length relationship, and the third equation of Formula 1 may be derived by combining the first and second equations.

The thickness (t) of the pouch 110 may range from about 0.05 mm to about 0.1 mm. If the thickness (t) of the pouch 110 is less than about 0.05 mm, the pouch 110 may easily be deformed or broken, and the electrolyte contained inside the pouch 110 may leak. In contrast, if the thickness (t) of the pouch 110 is greater than about 0.1 mm, the flexibility of the pouch 110 may be low, and thus, it may be difficult to form the protrusions 116 on the pouch 110.

The radius (b) of the protrusions 116 may range from about 0.05 mm to about 1.8 mm. If the radius (b) of the protrusions 116 is less than about 0.05 mm, the height (H) of the protrusions 116 is not sufficiently large, and thus the amount of deformation of the pouch 110, caused by the formation of the protrusions 116, may be insufficient. If the radius (b) of the protrusions 116 is greater than about 1.8 mm, the number of protrusions 116 per unit area is reduced, and thus the amount of deformation of the pouch 110, caused by the formation of the protrusions 116, may be insufficient. If the amount of deformation of the pouch 110, caused by the formation of the protrusions 116, is insufficient, when the pouch 110 is bent, stress may not be effectively distributed in the pouch 110 (described later in more detail), and thus concentration of stress may not be effectively prevented.

The height (H) of the protrusions 116 may range from about 0.05 mm to about 1.0 mm. If the height (H) of the protrusions 116 is less than about 0.05 mm, the amount of deformation of the pouch 110, caused by the formation of the protrusions 116, may be insufficient, and thus when the pouch 110 is bent, stress may not be effectively distributed (described later in more detail). If the height (H) of the protrusions 116 is greater than about 1.0 mm, the amount of deformation of the pouch 110, caused by the formation of the protrusions 116, may be excessive, and thus the strength of the pouch 110 may be decreased. In addition, since the volume of the pouch 110 increases in proportion to the height (H) of the protrusions 116, the pouch 110 may not be easily disposed in an electronic device, and the spatial efficiency of the pouch 110 may be lowered.

The radius of curvature (y) of the first curved portion 113 of each protrusion 116 may be adjusted to be within the range of about 0.1 mm to about 24.05 mm according to the thickness (t) of the pouch 110 and the height (H) and radius (b) of the protrusions 116. In addition, the radius of curvature (x) of the second curved portion 114 of each protrusion 116 may range from about 0.0 mm to about 23.95 mm. If the second curved portion 114 is not formed (x=0), a time necessary to form the pouch 110 may be reduced owing to omission of the second curved portion 114.

If the protrusions 116 are formed in accordance with the above-described ranges of the thickness (t) of the pouch 110, the height (H) and radius (b) of the protrusions 116, the ratio of the vertical cross-sectional area to the surface area of the protrusions 116 may be greater than about 1:1 but less than about 1:3. The vertical cross-sectional area of each protrusion 116 may be expressed as the product of the square of the radius (b) of the protrusion 116 and $\pi$ (i.e., vertical cross-sectional area=$\pi b^2$), and the surface area of each protrusion 116 may be expressed as the sum of the surface area of the first curved portion 113 and the surface area of the second curved portion 114.

If the protrusions 116 are formed in accordance with the above-described ranges of the thickness (t) of the pouch 110, the height (H) and radius (b) of the protrusions 116, the number of the protrusions 116 per unit area (1 cm$^2$) of the pouch 110 may be about 5 to about 125.

The amount of deformation of the pattern units U will now be described according to the formation of the protrusions 116 with reference to FIG. 3. Portions of the pouch 110 are the same as the pattern units U. Hereinafter, the x-axis, y-axis, and z-axis directions will be referred as first, second, and third directions, respectively.

Each of the pattern units U has a cross-section (e) perpendicular to the first direction and parallel to the second and third directions. The length (second-direction length) of the cross-section (e) measured in the second direction may be longer than a unit length (d) of the pattern unit U. In addition, the second-direction length of the cross-section (e) may vary along the first direction.

As shown in Table 1 below, a pattern unit U was divided into ten parts in the first direction to calculate variations of the second-direction length of the cross-section (e) and resulting strain levels. In the measurement, the unit length (d) of the pattern unit U was 3.0 mm, the thickness (t) of the pouch 110 was 0.07 mm, and the height (H) of the protrusions 116 was 0.3 mm.

TABLE 1

| Dividing positions (mm) | Second-direction length (mm) | Ratio (%) | Strain (%) |
| --- | --- | --- | --- |
| 0.0 | 3.1439 | 104.80 | 4.80 |
| 0.3 | 3.0965 | 103.22 | 3.22 |
| 0.6 | 3.0037 | 100.12 | 0.12 |
| 0.9 | 3.0050 | 100.17 | 0.17 |
| 1.2 | 3.0965 | 103.22 | 3.22 |
| 1.5 | 3.1439 | 104.80 | 4.80 |
| 1.8 | 3.0965 | 103.22 | 3.22 |
| 2.1 | 3.0050 | 100.17 | 0.17 |
| 2.4 | 3.0037 | 100.12 | 0.12 |
| 2.7 | 3.0965 | 103.22 | 3.22 |
| 3.0 | 3.1439 | 104.80 | 4.80 |
| Average | 3.0759 | 102.53 | 2.53 |

Referring to Table 1, although the unit length (d) of the pattern unit U on which the protrusions 116 are formed is 3.0 mm, the second-direction length of the cross-section (e) is 3.0759 mm on average. In other words, the second-direction length of the cross-section (e) is greater than the unit length (d) by 2.53% on average.

As shown in Table 2 below, pattern units U were each divided into ten parts in the first direction to calculate variations of the second-direction length of the cross-section (e) according to variations of the height (H) of the protrusions 116. In addition, strain levels were calculated according to the variations of the second-distance length of the cross-section (e). When the strain levels of the second-direction length of the cross-section (e) were calculated, the unit length (d) of the pattern units U was 3.0 mm, the thickness (t) of the pouch 110 was 0.07 mm, and the height (H) of the protrusions 116 was varied to be 0.3 mm, 0.4 mm, and 0.5 mm.

TABLE 2

| Dividing positions (mm) | Strain (%) | | |
| --- | --- | --- | --- |
| | 0.3 mm | 0.4 mm | 0.5 mm |
| 0.0 | 4.7967 | 8.4867 | 12.9533 |
| 0.3 | 3.2167 | 6.4533 | 10.3000 |
| 0.6 | 0.1233 | 0.5367 | 0.8667 |
| 0.9 | 0.1667 | 0.5367 | 0.8700 |
| 1.2 | 3.2167 | 6.4533 | 10.3000 |
| 1.5 | 4.7967 | 8.4867 | 12.9533 |
| 1.8 | 3.2167 | 5.4533 | 10.3000 |
| 2.1 | 0.1667 | 0.5367 | 0.8700 |
| 2.4 | 0.1233 | 0.5367 | 0.8667 |
| 2.7 | 3.2167 | 6.4533 | 10.3000 |
| 3.0 | 4.7967 | 8.4867 | 12.9533 |
| Average | 2.53 | 4.77 | 7.59 |

Referring to Table 2, the strain of the pattern units U increases in proportion to the height (H) of the protrusions 116. If the height (H) of the protrusions 116 increases, the strain of the second-direction length of the cross-section (e) increases.

With the advance of electronic technology, the electronic device market has increased, and thus demand for batteries for electronic devices has increased. Particularly, demand for flexible secondary batteries having a high degree of efficiency in utilization of space has increased in various application fields.

When flexible secondary batteries are manufactured, a bending reliability test is performed. In the test, pouches of flexible secondary batteries were repeatedly subjected to a bending force to check whether the flexible secondary batteries were damaged or broken. In addition, when a force is applied to a flexible secondary battery to place the flexible secondary battery in an installation space by bending the flexible secondary battery, a pouch of the flexible secondary battery may be damaged or broken.

Figure 5:
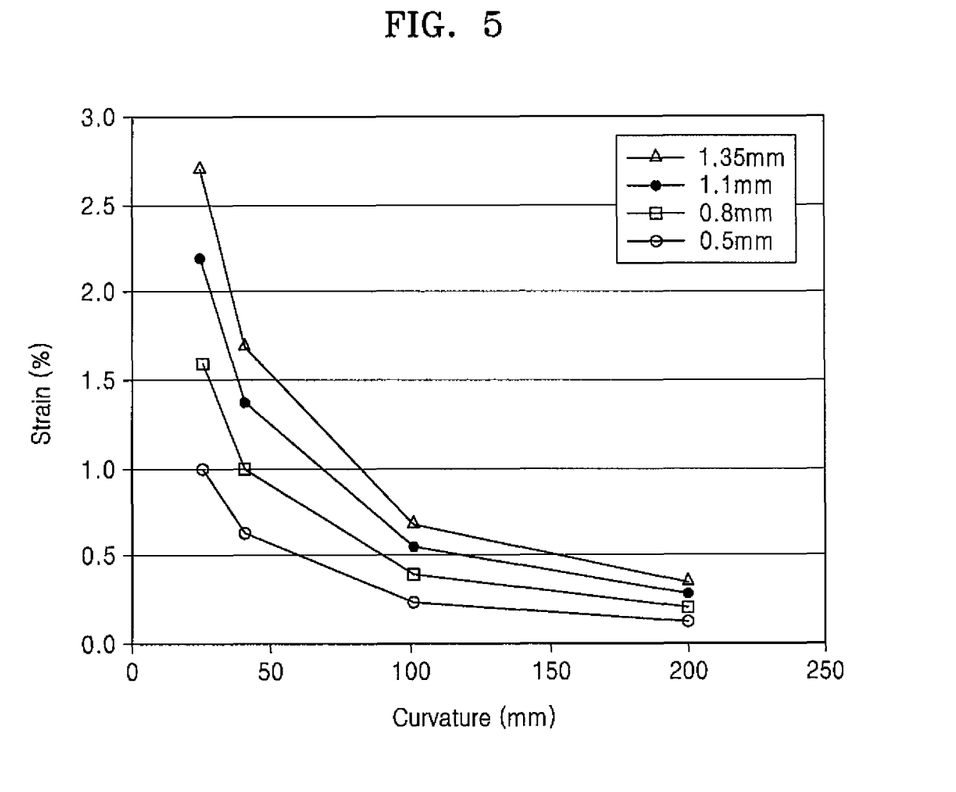
FIG. 5 is a strain-curvature graph of flexible secondary batteries.

FIG. 5 is a strain-curvature graph of flexible secondary batteries.

Electrode assemblies each having a length of 110 mm were used in a test performed to plot the strain-curvature graph of FIG. 5. The thicknesses of the electrode assemblies were 0.5 mm, 0.8 mm, 1.10 mm, and 1.35 mm, respectively, and the electrode assemblies were bent to radii of curvature of 25 mm, 40 mm, 100 mm, and 200 mm, respectively. Then, strain levels of the electrode assemblies were calculated according to the radii of curvature. If an electrode assembly is bent to have a certain radius of curvature, a portion of the electrode assembly is stretched into a convex shape, and the other portion of the electrode assembly is compressed into a concave shape. Therefore, the strain of the electrode assembly indicates the degree of expansion or compression of the electrode assembly in the length direction thereof.

$$S(\%) = \frac{t}{2R} \times 100 \qquad \text{Formula 2}$$

In Formula 2, S refers to the strain of an electrode assembly, t refers to the thickness of the electrode assembly, and R refers to the radius of curvature of the electrode assembly.

When an electrode assembly having a length of 110 mm along a thickness centerline is bent, a portion of the electrode assembly may be stretched into a convex shape to have tensile strain, and the other portion of the electrode assembly may be compressed into a concave shape to have compressive strain.

Since the pouch 110 of the flexible secondary battery 100 covers outer sides of the flexible secondary battery 100, if the electrode assembly 130 is bent to a radius of curvature as shown in FIG. 5, the pouch 110 receives substantially the same bending force as that the electrode assembly 130 receives. If data shown in Tables 1 and 2 and FIG. 5 is compared and analyzed, the following conclusion may be obtained. When the protrusions 116 are formed on the pouch 110, at least portions of the pouch 110 are deformed with a first strain. Then, if the electrode assembly 130 is bent, the electrode assembly 130 is stretched and compressed with a second strain. In this case, if the electrode assembly 130 is bent within a range in which the second strain is less than the first strain, the pouch 110 may not be permanently deformed or broken even though an external force is applied to the flexible secondary battery 100. In other words, permanent deformation or breakage of the flexible secondary battery 100 caused by an external force applied thereto may be minimized, and thus the durability of the flexible secondary battery 100 may be improved.

For example, if a secondary battery having a thickness (t) of 1.1 mm and not including protrusions 116 is bent to a radius of curvature of 25 mm, the secondary battery may be deformed with a strain of 2.2%. Thereafter, although the secondary battery is returned to an original shape thereof by resilience or elasticity, the rigidity of the secondary battery may be reduced, and the secondary battery may be cracked or torn.

In the case of Table 1, the pouch 110 has a thickness of 0.07 mm, and the protrusions 116 of the pouch 110 have a height (H) of 0.3 mm. In this case, if the pouch 110 covers an electrode assembly 130 having a thickness (t) of 1.1 mm, although the electrode assembly 130 is bent to a radius of curvature of 25 mm or greater, the pouch 110 may not be permanently deformed.

In the case of Table 2, the pouch 110 has a thickness of 0.07 mm, and the protrusions 116 of the pouch 110 have a height (H) of 0.4 mm. In this case, if the pouch 110 covers an electrode assembly 130 having a thickness (t) of 1.35 mm, although the electrode assembly 130 is bent to a radius of curvature of 25 mm or greater, the pouch 110 may not be permanently deformed.

In other words, since the pouch 110 is previously deformed to have a certain degree of strain, the deformation of the pouch 110 may be prevented within the certain degree of strain previously given to the pouch 110. That is, the degree of strain previously given to the pouch 110 by the formation of the protrusions 116 is adjusted to be greater than a degree of strain of the electrode assembly 130 when the flexible secondary battery 100 in which the electrode assembly 130 and the pouch 110 are coupled is deformed by a force applied thereto. Therefore, although an external force is applied to the flexible secondary battery 100, the pouch 110 may not be permanently deformed or damaged.

When an external force is applied to the flexible secondary battery 100, the external force may be distributed to the protrusions 116 of the pouch 110, and thus the durability of the pouch 110 may be improved. When an external force is applied to the flexible secondary battery 100, the pouch 110 may be flexibly deformed while the protrusions 116 and the base portion 117 formed between the protrusions 116 are stretched or compressed. Therefore, although an external force is applied to the flexible secondary battery 100, the pouch 110 may not be permanently deformed or damaged.

Since the pouch 110 used as a sealing material for the flexible secondary battery 100 includes the protrusions 116, stress caused by an external force may be distributed to the protrusions 116. Therefore, the durability of the flexible secondary battery 100 may be improved.

The second curved portions 114 are formed in the protrusions 116 so that the protrusions 116 may have a gentle curvature, and thus the pouch 110 of the flexible secondary battery 100 may be less cracked or torn.

As described above, according to the one or more of the above exemplary embodiments, the stability of the flexible secondary battery 100 may be maintained when the flexible secondary battery 100 is repeatedly flexed or bent.

Other effects of the exemplary embodiments may be understood from the above description with reference to the accompanying drawings.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A flexible secondary battery comprising:
   an electrode assembly comprising a first electrode plate, a second electrode plate, and a separator between the first and second electrode plates; and
   a pouch sealing the electrode assembly and an electrolyte therein, the pouch having:
   a planar base portion; and
   a plurality of protrusions, each one of the plurality of protrusions:
      extending in a first protrusion direction away from the planar base portion;
      having a first curved portion directly contacting the planar base portion and extending in the first protrusion direction;
      having a second curved portion directly contacting the first curved portion and being spaced from the planar base portion and extending in the first protrusion direction, wherein the first curved portion and the second curved portion are connected to each other at a curvature change portion where a degree of curvature changes; and
      being spaced from every other protrusion on the planar base portion.

2. The flexible secondary battery of claim 1, wherein the first curved portion protrudes outward away from a center of the respective protrusion; and
   the second curved portion is formed along an edge of the first curved portion.

3. The flexible secondary battery of claim 1, wherein the second curved portion is spaced from a center of the first curved portion by a constant distance and entirely surrounds the first curved portion.

4. The flexible secondary battery of claim 1, wherein the first curved portion is convex and the second curved portion is concave.

5. The flexible secondary battery of claim 1, wherein the first curved portion has a greater radius of curvature than the second curved portion.

6. The flexible secondary battery of claim 1, wherein the first curved portion and the second curved portion have radii of curvature satisfying the following formula:

$$(x+t+a)^2 + b^2 = (x+y)^2$$
$$y = t + H + a$$
$$x = \frac{b^2}{2H} - \frac{H}{2} - t - a$$

where t=thickness of the pouch, x=radius of curvature of the second curved portion, y=radius of curvature of the first curved portion, b=radius of each of the protrusions, H=height of each of the protrusions, and a=y−H−t.

7. The flexible secondary battery of claim 6, wherein the pouch has a thickness from about 0.05 mm to about 0.1 mm.

8. The flexible secondary battery of claim 6, wherein the radius of each of the protrusions ranges from about 0.05 mm to about 1.8 mm.

9. The flexible secondary battery of claim 6, wherein the height of each of the protrusions ranges from about 0.05 mm to about 1.0 mm.

10. The flexible secondary battery of claim 1, wherein a ratio of a vertical cross-sectional area to a surface area of each of the protrusions is greater than about 1:1 but less than about 1:3.

11. The flexible secondary battery of claim 1, wherein a number of protrusions per square centimeter of the pouch is about 5 to about 125.

12. The flexible secondary battery of claim 1 further comprising:
   a first electrode tab connected to the first electrode plate; and
   a second electrode tab connected to the second electrode plate.

13. A flexible secondary battery comprising:
   an electrode assembly comprising a first electrode plate, a second electrode plate, and a separator between the first and second electrode plates; and
   a pouch sealing the electrode assembly and an electrolyte therein, the pouch comprising a pattern unit, wherein the pattern unit comprises:
   a planar base portion; and
   a plurality of protrusions, each one of the plurality of protrusions:
      extending in a first protrusion direction away from the planar base portion;
      having a first curved portion directly contacting the planar base portion and extending in the first protrusion direction;
      having a second curved portion directly contacting the first curved portion and being spaced from the planar base portion and extending in the first protrusion direction, wherein the first curved portion and the second curved portion are connected to each other at a curvature change portion where a degree of curvature changes; and
   being spaced from every other protrusion on the planar base portion
   wherein one of the first and second curved portions is concave and the other is convex;
   a sub-protrusion close to each of the plurality of protrusions; and
   a base portion located between each of the plurality of protrusions and a respective sub-protrusion.

14. The flexible secondary battery of claim 13, wherein the first curved portion protrudes outward away from a center of the respective protrusion; and
   the second curved portion is formed outside the first curved portion and connected to the base portion.

15. The flexible secondary battery of claim 13, wherein the second curved portion is spaced from a center of the first curved portion by a constant distance and entirely surrounds the first curved portion.

16. The flexible secondary battery of claim 13, wherein the first curved portion is convex and the second curved portion is concave.

17. The flexible secondary battery of claim 13, wherein the first curved portion has a greater radius of curvature than the second curved portion.

18. The flexible secondary battery of claim 13, wherein the pattern unit extends in a first direction, in a second direction perpendicular to the first direction, and in a third direction orthogonal to the first and second directions, wherein the protrusion protrudes in the third direction,
   wherein the pattern unit has a cross-section perpendicular to the first direction and parallel to the second and third directions, and
   wherein the cross-section has a second-direction length that is longer than a second-direction unit length of the pattern unit.

19. The flexible secondary battery of claim 18, wherein the second-direction length of the cross-section of the pattern unit varies along the first direction.

20. The flexible secondary battery of claim 13, wherein the first curved portion and the second curved portion have radii of curvature satisfying the following formula:

$$(x+t+a)^2 + b^2 = (x+y)^2$$
$$y = t + H + a$$
$$x = \frac{b^2}{2H} - \frac{H}{2} - t - a$$

where t=thickness of the pouch, x=radius of curvature of the second curved portion, y=radius of curvature of the first curved portion, b=radius of the protrusion, H = height of the protrusion, and a=y—H—t.

* * * * *